(12) United States Patent
Tong et al.

(10) Patent No.: US 7,280,466 B2
(45) Date of Patent: Oct. 9, 2007

(54) TRANSMITTER FOR A WIRELESS COMMUNICATIONS SYSTEM USING MULTIPLE CODES AND MULTIPLE ANTENNAS

(75) Inventors: Wen Tong, Ottawa (CA); Yuri S. Shinakov, Moskow (RU); Alexandre M. Chloma, Moskovskaja Oblast (RU); Mikhail G. Bakouline, Moskovskaha Oblast (RU); Vitali B. Kreindeline, Moskow (RU)

(73) Assignee: Nortel Networks Limited, St. Laurent, Quebec (CA)

( * ) Notice: Subject to any disclaimer, the term of this patent is extended or adjusted under 35 U.S.C. 154(b) by 951 days.

(21) Appl. No.: 10/116,054

(22) Filed: Apr. 5, 2002

(65) Prior Publication Data

US 2003/0081539 A1    May 1, 2003

(30) Foreign Application Priority Data

Apr. 5, 2001    (WO) .................... PCT/RU01/00135

(51) Int. Cl.
*H04J 11/00*    (2006.01)
(52) U.S. Cl. .................. 370/208; 370/536; 375/146
(58) Field of Classification Search ................ 370/208, 370/209, 335, 342, 535, 536, 542, 543, 544; 375/299; 455/101
See application file for complete search history.

(56) References Cited

U.S. PATENT DOCUMENTS

| 5,652,764 | A | | 7/1997 | Kanzaki et al. ............. 375/200 |
|---|---|---|---|---|
| 5,933,424 | A | * | 8/1999 | Muto ........................ 370/342 |
| 6,038,263 | A | * | 3/2000 | Kotzin et al. ............... 375/299 |
| 6,262,971 | B1 | * | 7/2001 | Schilling .................... 370/208 |
| 6,370,129 | B1 | * | 4/2002 | Huang ........................ 370/329 |
| 6,512,737 | B1 | * | 1/2003 | Agee ......................... 370/208 |
| 6,628,631 | B1 | * | 9/2003 | Mazawa et al. ............. 370/331 |
| 6,721,339 | B2 | * | 4/2004 | Li et al. ..................... 370/535 |
| 6,834,047 | B1 | * | 12/2004 | Yoon et al. ................. 370/342 |
| 2002/0122398 | A1 | * | 9/2002 | Jou .............................. 370/335 |
| 2002/0191569 | A1 | * | 12/2002 | Sung et al. ................. 370/335 |
| 2003/0081539 | A1 | * | 5/2003 | Tong et al. ................. 370/208 |
| 2003/0124995 | A1 | * | 7/2003 | Tanaka ....................... 455/101 |

FOREIGN PATENT DOCUMENTS

| WO | 9912274 | 7/1997 |
|---|---|---|
| WO | 0101605 | 6/2000 |

* cited by examiner

*Primary Examiner*—Chi Pham
*Assistant Examiner*—Kevin Mew

(57) ABSTRACT

In a transmitter of a wireless communications system having M transmit antennas (10), each transmit antenna is supplied with a respective combined signal comprising a respective one of M groups each of N data sub-streams, orthogonally spread by N Walsh code sequences (W1 to WN). The N orthogonal code sequences used for each of the M groups comprise a respective one of M different combinations of N from $N_w$ orthogonal code sequences, where $N_w > N$. M and N are integers greater than one. The combined signals can also include orthogonally spread pilot signals (WP) for channel estimation at a receiver. Orthogonality of the signals transmitted from the transmit antennas is increased, so that transmit signal power can be decreased and/or the receiver can have fewer than M receive antennas.

25 Claims, 3 Drawing Sheets

TRANSMITTER FOR A WIRELESS COMMUNICATIONS SYSTEM USING MULTIPLE CODES AND MULTIPLE ANTENNAS

This invention relates to a transmitter for a wireless communications system, and is particularly concerned with a transmitter using multiple codes and multiple antennas.

BACKGROUND

There is a desire to increase data rates for communication of data in wireless communications systems, without adversely affecting other parameters of these systems, such as error rate, complexity, transmitted signal power, and costs.

To this end, it is known to provide a wireless communications system transmitter in which encoded and modulated data to be transmitted is divided into multiple data sub-streams, which are subjected to code spreading using orthogonal codes such as Walsh functions (or code sequences, also referred to as Walsh codes for simplicity), the resulting Walsh coded data sub-streams then being combined and scrambled using a complex PN (pseudo random or pseudo noise) sequence to produce a signal which is amplified in a linear power amplifier (LPA) and transmitted via a single transmit antenna.

For example, in order to provide a data transmission rate of 10.8 Mbps, such a transmitter may use rate 3/4 data encoding, 64 QAM (quadrature amplitude modulation), and 20 data sub-streams and corresponding Walsh codes.

64 QAM provides a relatively high number (6) of bits per modulation symbol, and consequently for a similar signal to noise ratio requires a substantially greater transmit power of the LPA than would be required for lower rate modulation methods such as 16 QAM, 8 PSK (phase shift keying), and QPSK (quadrature PSK) providing respectively 4, 3, and 2 bits per symbol. The LPA constitutes a considerable part of the costs of a transmitter, and this cost increases substantially with increasing transmit signal power, so that it is desirable to use a lower rate modulation method while still providing the desired high data rate.

To this end, it is also known to divide the encoded and modulated data to be transmitted into a larger number of sub-streams, which ale grouped in M groups (M being an integer greater than 1) each of which groups of data sub-streams is processed as described above and supplied via a respective one of M LPAs to a respective one of M transmit antennas. With such a transmitter, for example with M=4 a data transmission rate of 10.8 Mbps can be achieved using rate 1/2 data encoding, QPSK modulation, and 20 data sub-streams and corresponding Walsh codes. The reduced power required of the LPAs due to the lower rate modulation method and the use of 4 LPAs each contributing one quarter of the total transmit signal power can result in a reduction in costs of the transmitter.

At each receiver of such a wireless communications system, each receive antenna receives the signals transmitted from all of the M antennas. In order to separate the data sub-streams at the receiver, it is necessary to process received signals in dependence upon a channel matrix H which must be determined at the receiver. The channel matrix H represents characteristics of each channel or path from each transmit antenna to each receive antenna, and for example can be determined using pilot signals which are also transmitted from the transmitter to the receiver.

The performance of a known system as described above is dependent upon the extent to which the different channels or paths from the M transmit antennas to the receive antennas are uncorrelated, i.e. the extent to which they are subject to fading independently of one another. The less the correlation, the better the performance. However, it has been found that there can be substantial correlation among these paths. In view of this, in such a system it has been necessary for the receiver to have at least M receive antennas, the channel matrix H then being determined as at least an M by M (i.e. M rows and M columns) matrix.

More generally, a known system as described above is required to have at least as many receive antennas as there are transmit antennas. In contrast to this, it would be desirable to provide each receiver with only a relatively small number of receive antennas, for example only two receive antennas, but this would undesirably limit the number of transmit antennas to this small number and would correspondingly limit the advantages of the transmitter described above.

Furthermore, it continues to be desirable to reduce still further the transmit signal power required of the LPAs for a given data rate, or conversely to increase the data rate without similarly increasing the transmit signal power.

SUMMARY OF THE INVENTION

According to one aspect, this invention provides a transmitter for a wireless communications system, comprising: a demultiplexer arranged to produce M groups each of N data sub-streams from data to be transmitted, where N and M are integers greater than one; M orthogonal code spreaders each arranged to spread the N data sub-streams of a respective one of the M groups using N orthogonal code sequences; and M signal combiners each arranged to combine the N orthogonally spread data sub-streams of a respective one of the M groups to produce a respective combined signal for transmission via a respective one of M transmit antennas; characterized in that the N orthogonal code sequences used for each of the M groups comprise a respective one of M different combinations of N from $N_w$ orthogonal code sequences, where $N_w > N$.

Preferably the orthogonal code sequences comprise Walsh functions of length L, where $L=2^k$ and k is an integer greater than one, and typically $N_w < L$.

To facilitate channel estimation at a receiver using pilot signals, each signal combiner can also be arranged to combine with the respective N orthogonally spread data sub-streams a pilot signal which is orthogonally spread relative to the data sub-streams of the respective group and relative to the pilot signal of each other group.

Another aspect of the invention provides a wireless communications system comprising a transmitter as recited above with M transmit antennas via which the respective combined signals are transmitted, and a receiver with P receive antennas via which signals transmitted from the transmit antennas are received, where P is an integer greater than one. M can be greater than P, and in particular embodiment of the system there can be M=4 transmit antennas and P=2 receive antennas.

The invention also provides a method of increasing orthogonality of signals transmitted from M transmit antennas in a wireless communications system, comprising the steps of: producing signals to be transmitted from each transmit antenna by combining N data sub-streams orthogonalized by N orthogonal code sequences, M and N being integers greater than one; and selecting the N orthogonal code sequences used for each of the M transmit antennas as a respective one of M different combinations of N from $N_w$ orthogonal code sequences, where $N_w > N$.

Conveniently the orthogonal code sequences comprise Walsh functions of length L, where $L=2^k$ and k is an integer greater than one, and for example $N_w \leq L$.

BRIEF DESCRIPTION OF THE DRAWINGS

The invention will be further understood from the following description with reference to the accompanying drawings, in which she same references are used to denote similar elements in different figures and in which, by way of example.

DETAILED DESCRIPTION

Figure 1:
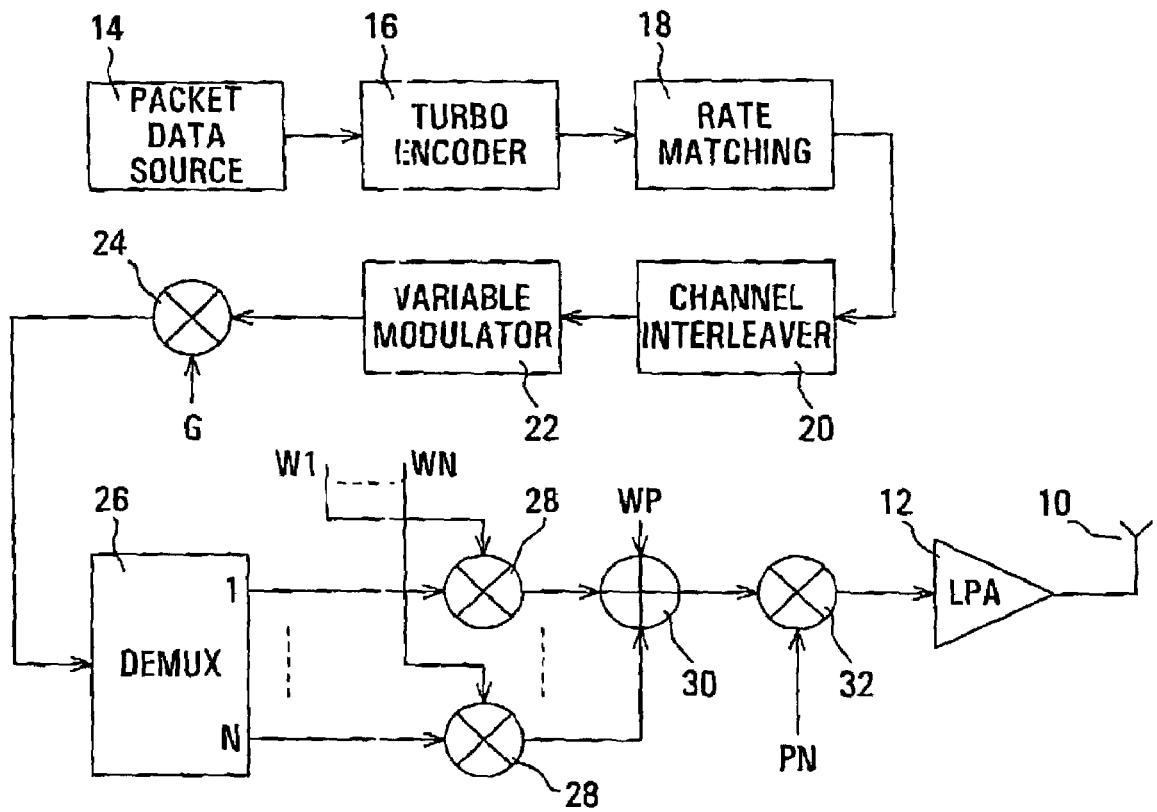
FIG. 1 illustrates a known multiple code transmitter of a wireless communications system.

Referring to the drawings, FIG. 1 illustrates a known multiple code transmitter of a wireless communications system, using a single transmit antenna 10 which is coupled to the output of a single linear power amplifier (LPA) 12.

In the transmitter of FIG. 1, data for example from a packet data source 14 is encoded by a turbo encoder (parallel concatenated convolutional coder) 16, the encoded data being processed in known rate matching and channel interleaving functions 18 and 20 respectively and being supplied to a modulator 22, which modulates the encoded data in accordance with any of a plurality of modulation methods (e.g. QPSK, 8 PSK, 16 QAM, and 64 QAM) and accordingly is referred to as a variable modulator.

Modulated data symbols produced by the modulator 22 are provided with a desired channel gain G in a gain element 24 and are supplied to a demultiplexer 26, which divides them among a plurality of N outputs which are referred to as multiple code data sub-streams.

The N multiple code data sub-streams are orthogonally spread by multiplying them in respective ones of N multipliers 28 by respective ones of N orthogonal Walsh code sequences or functions W1 to WN. For example, with N=20 the Walsh code sequences W1 to WN can be a selected 20 of a set of 32 possible Walsh code sequences of length L=32, the others of which are reserved for other uses, for example for a pilot signal as described below and for communication of voice and paging signals with the date signals. Generally, the length L of the Walsh code sequences is equal to $2^k$, where k is an integer which here is greater than one, and there are L orthogonal Walsh code sequences. The N multipliers 28 constitute an orthogonal code spreader for the N data sub-streams.

The N orthogonally spread data sub-streams produced at the outputs of the multipliers 28 are combined in a signal combiner or adder 30, which also adds a pilot signal WP for channel estimation in known manner. The pilot signal WP also incorporates a respective Walsh code sequence so that it is orthogonal to the data sub-streams. Voice and paging signals which are orthogonally spread by others of the Walsh code sequences may similarly be combined by the signal combiner 30.

The combined orthogonally-spread data sub-streams produced at the output of the signal combiner 30 are multiplied in a multiplier 32 by a complex PN scrambling code in known manner, and the resulting signal is amplified by the LPA 12 for supply to and transmission by the transmit antenna 10.

Figure 2:
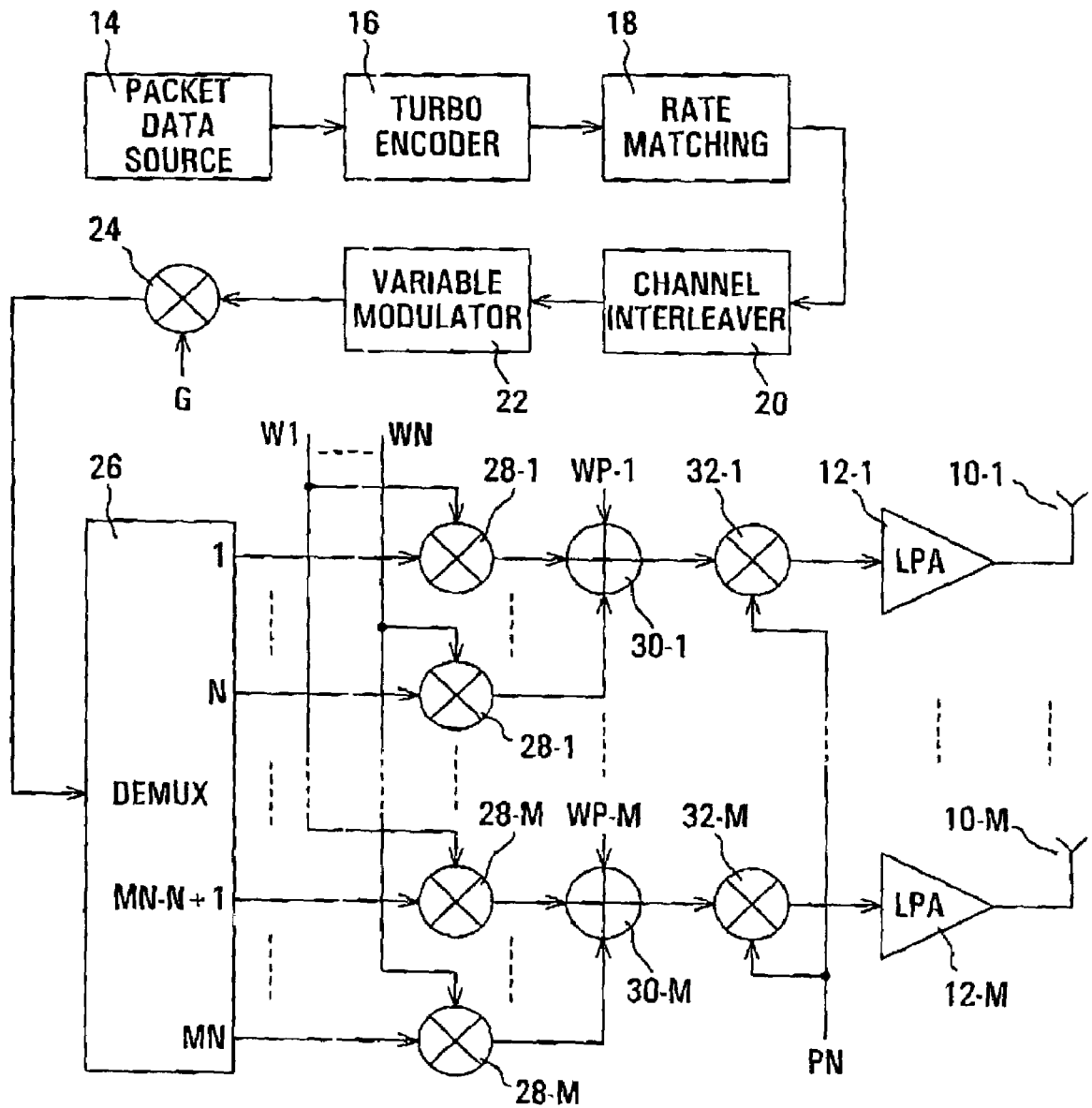
FIG. 2 illustrates a known multiple code multiple antenna transmitter of a wireless communications system.

As described above, the transmitter of FIG. 1 requires a relatively high modulation rate, and consequently a relatively high transmitted signal power and costly LPA, to provide a high data rate of the order of 10 Mbps or more. To avoid this disadvantage, a transmitter with multiple transmit antennas can be used as illustrated in FIG. 2. In this respect it is observed that the term "multiple" as used herein in the context of antennas means two or more antennas, and the term "antennas" includes different polarizations of signals transmitted or received by a single antenna.

Referring to FIG. 2, the transmitter illustrated therein is similar to that of FIG. 1, except that it has a plurality of M transmit antennas referenced 10-1 to 10-M, and correspondingly M groups of N Walsh code sequence multipliers referenced 28-1 to 28-M, M signal combiners referenced 30-1 to 30-M, M PN scrambling code multipliers referenced 32-1 to 32-M, and M LPAs referenced 12-1 to 12-M. For simplicity, only the elements of the first and M-th groups are shown in FIG. 2.

In the transmitter of FIG. 2, the demultiplexer 26 divides the modulated data symbols produced by the modulator 22 among M groups each of N outputs, thereby producing MN data sub-streams. The first N of these data sub-streams, numbered 1 to N at the output of the demultiplexer 26, are supplied to the multipliers 28-1 to 28-N respectively where they are multiplied by the respective Walsh code sequences W1 to WN respectively, the resulting orthogonalized signals being combined, along with a respective orthogonal pilot signal WP-1, by the signal combiner 30-1, the resulting combined signals being scrambled by the PN scrambling code in the multiplier 32-1, amplified by the LPA 12-1 and transmitted by the transmit antenna 10-1.

Similar comments apply to each other group of N data sub-streams. Thus in the transmitter of FIG. 2, each group of N data sub-streams is processed in the same manner as described above in relation to FIG. 1, and is transmitted via its respective transmit antenna. The same Walsh code sequences W1 to WN are used for all of the M groups.

To enable the receiver to distinguish and estimate the channels using the pilot signals, it is necessary for these to be orthogonalized with respect to one another, as well as being orthogonal to the data sub-streams of each channel. To this end, the pilot signals WP-1 to WP-M for transmission by the respective transmit antennas 10-1 to 10-M are orthogonalized with respect to one another using different Walsh code sequences. Conveniently, with the data sub-stream Walsh code sequences W1 to WN being of length L=32 and for example with N=20, the pilot signal Walsh code sequences can be of length 256 derived from another Walsh code sequence of length 32 orthogonal to the Walsh code sequences W1 to WN, thereby maintaining overall code orthogonality among the data sub-streams and pilot signals.

Walsh coding of pilot signals as described above is only one example of various possible ways of facilitating channel estimation at the receiver. For example, the pilot signals could alternatively be transmitted in a time division multiplexed manner with the data signals.

The receiver determines (estimates) channel coefficients for the channel matrix H in known manner from a correlation of received signals with the pilot signal sequence, and uses the channel matrix H for processing the received signals to determine the transmitted data. For example, in this received signal processing the receiver can first determine the strongest group of data sub-streams, and it can then subtract a corresponding component from the received signals to facilitate determining the next strongest group, and so on for each group of data sub-streams.

The reliability and ease of determining the data sub-streams is dependent upon the accuracy with which the channel matrix H is estimated, which in turn is dependent upon independence or non-correlation of the paths from the transmit antennas to the receive antennas. However, it has been found that in fact there can be substantial correlation among these paths, which detracts from performance of the system.

In addition, such correlation makes it necessary in practice for the receiver to have at least as many receive antennas as the transmitter has transmit antennas, i.e. at least M receive antennas. Furthermore, proximity of different receive antennas at the receiver tends to increase the correlation of the paths from the transmit antennas to the receive antennas. Such factors make it impractical, for example, to provide a 10 Mbps system having a transmitter as illustrated in FIG. 2 with M=4 transmit antennas, and only two receive antennas for each receiver. It would be desirable to be able to use, for example, only two receive antennas, in order to provide both a relatively small size as is desired for receivers and relative simplicity, which can be facilitated by using an MMSE (minimum mean squared error) receiver with two antennas.

Figure 3:
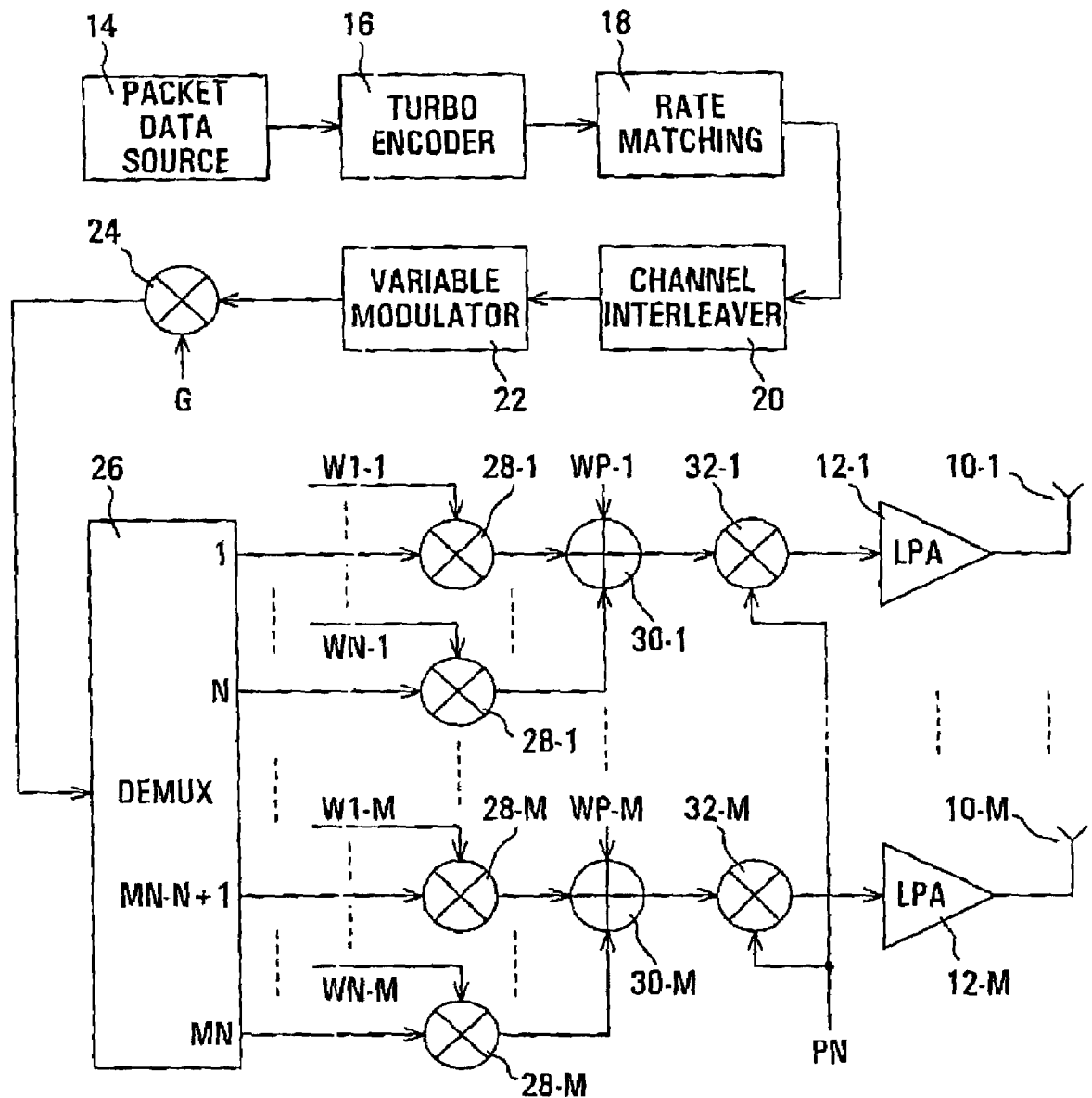
FIG. 3 illustrates a multiple code multiple antenna transmitter of a wireless communications system in accordance with an embodiment of the invention.

FIG. 3 illustrates a transmitter of a wireless communications system in accordance with an embodiment of the invention. The transmitter of FIG. 3 is similar to that of FIG. 2, and accordingly the same references are used, except for the Walsh code sequences supplied to the multipliers 28-1 to 28-M. As shown in FIG. 3, the N multipliers 28-1 for the first group of data sub-streams are supplied with a first group of N Walsh code sequences W1-1 to WN-1 respectively, and the N multipliers 28-M for the M-th group of data sub-streams are supplied with an M-th group of N Walsh code sequences W1-M to WN-M respectively.

Considered generally, in the transmitter of FIG. 3 the N multipliers 28-m for the m-th group of data sub-streams are supplied with an m-th group of N Walsh code sequences W1-m to WN-m respectively, where m is an integer from 1 to M.

In addition, although as described below individual Walsh code sequences may, and typically will, be used in more than one of the M groups each of N Walsh code sequences, each of the M groups of N Walsh code sequences is selected to include a combination of these Walsh code sequences which is different from the combination of N Walsh code sequences used for each other group. In other words, the N orthogonal code sequences used for each of the M groups comprise a respective one of M different combinations of N from $N_w$ orthogonal code sequences, where $N_w > N$. This is explained further below with reference to an example.

For example, with M=4 transmit antennas, a spreading code length L=32, and N=20, allowing for example a number of $N_p$=M=4 Walsh code sequences or functions for orthogonalizing the pilot sequence nor channel estimation leaves up to $N_w$=L−$N_p$=28 possible Walsh functions from which the N=20 Walsh functions can be derived differently for different ones of the M groups. Numbering these $N_w$=28 usable Walsh functions from 0 to 27, for example they can be allocated to the M=4 groups in the following manner:

| | |
|---|---|
| Group 1: | Walsh functions numbered 0 to 19; |
| Group 2: | Walsh functions numbered 8 to 27; |
| Group 3: | Walsh functions numbered 0 to 7 and 16 to 27; |
| Group M = 4: | Walsh functions numbered 0 to 15 and 24 to 27. |

It can be seen from this example that even though individual Walsh functions are used in different groups, for example each of the Walsh functions numbered 20 to 23 is used in groups 2 and 3, each of the M groups is allocated a unique combination of N=20 of the $N_w$=28 usable Walsh functions.

This use of different combinations of Walsh functions for the different groups increases orthogonality of the signals transmitted by the M antennas, to a substantial extent even for small differences among the different combinations. For example, in the above case with N=20, even with $N_w$=N+1=21 there can be a significant increase in orthogonality of the transmitted signals and corresponding improvement in the performance of the wireless communications system.

Such improvements in performance can have several significant consequences. In particular, the increased orthogonality of the transmitted signals can provide improved channel estimation, so that the channel matrix H can be determined more accurately and reliably; consequently this channel matrix H can be determined in a receiver using only two receive antennas, thereby enabling the receiver to be simplified in a manner which has not been possible with the transmitter of FIG. 2.

More generally, the increased orthogonality of the transmitted signals reduces or removes from the system the limitation of having at least as many receive antennas as there are transmit antennas. Consequently, the number M of groups and transmit antennas can be increased, without a corresponding increase in receiver complexity.

Furthermore, the improved performance is manifested by an improvement, other parameters being equal, in signal to noise ratio of the communicated data. This enables the transmit power of the LPAs 12-1 to 12-M to be reduced, with significant cost advantages as indicated above.

The above description assumes that there are spare usable Walsh functions, i.e. that the number $N_w$ of usable Walsh functions is greater than the number N of Walsh functions used for each group of data sub-streams. In a system in which this would not otherwise be the case, the number N can be reduced to make N<$N_w$, and other parameters of the transmitter, namely the modulation method and turbo code rate (and the number M of transmit antennas), can be modified to provide the desired data rate. Examples of this are included below.

Whilst it might be expected that this would merely result in the same performance of the system, this is not the case and in fact an improved performance can be achieved, as can be seen from the specific examples given below. For example, in the case described above with N=20, instead values of N=15 and $N_w$=20 may be used, without any increase in the number of Walsh functions allocated collectively to the M groups. In this case for example with M=4, Walsh functions numbered 0 to 19 may be allocated to the groups as follows:

Group 1: Walsh functions numbered 0 to 14;
Group 2: Walsh functions numbered 5 to 19;
Group 3: Walsh functions numbered 0 to 4 and 10 to 19;
Group M = 4: Walsh functions numbered 0 to 9 and 15 to 19.

To compensate for the reduced number N, either the coding rate or the modulation method, or both, may be changed. In the last case, for example, instead of using N=20 with a coding rate of 9/16 (16 encoded bits from 9 input bits) and QPSK modulation, the transmitter can use $N_w$=20, N=15, a coding rate of 3/4 and QPSK modulation, or a coding rate of 1/2 and 8 PSK modulation, to provide the same overall data rate. In each case this can provide an improved performance, as shown in Table 1 below.

The following Tables provide specific examples of improvements which can be provided by embodiments of the invention in particular cases, and are all given by way of illustration and not by way of limitation. In each Table, transmit power or energy per symbol (Eb/No) figures are given in dB for frame error rates (FER) of 10% and 1% and for different combinations of parameters, including data rate, code rate, modulation method (and hence bits per modulation symbol), and values of N and $N_w$.

Table 1 relates to a system with M=4 transmit antennas, P=4 receive antennas, a Walsh code length of L=32, a data rate of 10.8 Mbps, and real channel estimation of channels with uncorrelated slow Rayleigh fading:

TABLE 1

| Case | Code Rate | Mod. | N | FER | Eb/No dB at FER for Nw = 20 | 22 | 24 | 28 |
|---|---|---|---|---|---|---|---|---|
| 1 | 9/16 | QPSK | 20 | 10% | 4.15 | 3.15 | 2.35 | 1.35 |
|   |   |   |   | 1% | 8.25 | 6.15 | 4.95 | 3.60 |
| 2 | 3/4 | QPSK | 15 | 10% | 3.70 | 3.25 | 2.80 | 2.00 |
|   |   |   |   | 1% | 6.30 | 5.75 | 5.10 | 4.05 |
| 3 | 1/2 | 8PSK | 15 | 10% | 3.35 | 2.95 | 2.40 | 1.60 |
|   |   |   |   | 1% | 5.70 | 4.95 | 4.40 | 3.40 |
| 4 | 5/8 | 8PSK | 12 | 10% | 4.00 | 3.30 | 2.60 | 2.30 |
|   |   |   |   | 1% | 6.50 | 5.75 | 4.70 | 4.40 |
| 5 | 3/4 | 8PSK | 10 | 10% | 4.70 | 4.50 | 4.35 | 3.85 |
|   |   |   |   | 1% | 7.15 | 6.90 | 6.60 | 6.05 |

In Table 1, the transmit power figures in italics for the Case 1 instance with N=20 and $N_w$=20 relate to the known transmitter of FIG. 2. All of Cases 1 to 5 provide the same data rate, thus the product of the code rate provided by the turbo encoder 16, the number of bits per symbol (2 for QPSK, 3 for 8 FSK) provided by the respective modulation method used by the variable modulator 22, and the number N of Walsh functions allocated to each group, as specified in the second, third, and fourth columns of Table 1, is the same for all of Cases 1 to 5.

The lowest transmit power figures, shown bold in Table 1, are mostly provided in this example by Case 3, with rate 1/2 turbo coding, 8 PSK modulation, and N=15. As shown by Table 1, these figures decrease as $N_w$ is increased (for example) from 20 to 28, i.e. as the orthogonality of the Walsh functions used for the different groups is increased. However, as also shown by Table 1, for 10% FER and $N_w$=24 or 28, Case 1 provides slightly better performance (lower transmit power figures for the same frame error rate).

Table 2 also relates to a system with M=4 transmit antennas, P=4 receive antennas, a Walsh code length of L=32, and real channel estimation of channels with uncorrelated slow Rayleigh fading. Table 2 provides transmit power figures in a similar manner to Table 1 for Cases 6 to 9, for higher data rates of 14.4 and 21.6 Mbps, in each case with N=20:

TABLE 2

| Case | Code Rate | Mod. | Data Rate | FER | Eb/No dB at FER for Nw = 20 | 22 | 24 | 28 |
|---|---|---|---|---|---|---|---|---|
| 6 | 3/4 | QPSK | 14.4 Mbps | 10% | 8.5 | 6.6 | 5.0 | 3.4 |
|   |   |   |   | 1% | 25.5 | 10.75 | 8.15 | 6.25 |
| 7 | 1/2 | 8PSK | 14.4 Mbps | 10% | 7.8 | 5.7 | 4.4 | 3.1 |
|   |   |   |   | 1% | 22.75 | 8.6 | 7.05 | 5.3 |
| 8 | 3/4 | 8PSK | 21.6 Mbps | 10% | 14.9 | 13.4 | 11.2 | 7.3 |
|   |   |   |   | 1% | 24.8 | 22.5 | 18.0 | 10.8 |
| 9 | 9/16 | 16QAM | 21.6 Mbps | 10% | 14.5 | 12.8 | 10.0 | 6.9 |
|   |   |   |   | 1% | 23.9 | 21.4 | 14.9 | 10.0 |

In Table 2, the figures in italics for $N_w$=20 relate to the known transmitter of FIG. 2. It can be seen that in each of Cases 6 to 9 there is an improvement in performance as $N_w$ is increased. Bold figures in Table 2 indicate the best performance (lowest transmit power figures), this being provided in this example by a turbo code rate of 1/2 and 8 PSK modulation to provide a data rate of 14.4 Mbps, and by a turbo code rate of 9/16 and 16 QAM modulation to provide a data rate of 21.6 Mbps.

Table 3 relates to a system with M=4 transmit antennas, an MMSE receiver using P=2 receive antennas, a Walsh code length of L=32, a data rate of 10.8 Mbps, and real channel estimation of channels with uncorrelated slow Rayleigh fading. Asterisks in Table 3 indicate figures which are in excess of 30 dB. There are no italic figures in Table 3 (such a system with 4 transmit antennas and 2 receive antennas not being practical in the prior art), and bold figures again indicate the best performance (lowest transmit power figures):

TABLE 3

| Case | Code Rate | Mod. | N | FER | Eb/No dB at FER for Nw = 20 | 22 | 24 | 28 |
|---|---|---|---|---|---|---|---|---|
| 10 | 1/2 | 8PSK | 15 | 10% | * | * | 15.8 | 10.2 |
|   |   |   |   | 1% | * | * | 21.5 | 14.1 |
| 11 | 5/8 | 8PSK | 12 | 10% | * | 15.5 | 11.7 | 10.7 |
|   |   |   |   | 1% | * | 22.0 | 16.5 | 14.8 |
| 12 | 3/4 | 8PSK | 10 | 10% | 16.0 | 15.1 | 14.4 | 12.7 |
|   |   |   |   | 1% | 23.8 | 22.9 | 21.2 | 17.9 |
| 13 | 9/16 | 16QAM | 10 | 10% | 16.6 | 16.1 | 15.2 | 13.4 |
|   |   |   |   | 1% | 24.5 | 23.7 | 21.3 | 18.9 |

Table 4 relates to a system with M=2 transmit antennas, an MMSP receiver using P=2 receive antennas, a Walsh code length of L=32, a data rate of 10.8 Mbps, and real channel estimation of channels with uncorrelated slow Rayleigh fading. In Table 4, the figures in italics for Cases 14 and 15 with $N_w$=20 relate to the known transmitter of FIG. 2 with two transmit antennas and two receive antennas. Bold figures in Table 4 indicate the best performance (lowest transmit power figures). It can be seen from Table 4 that with $N_w$=20 the best performance is provided by Case 16 with rate 3/4 coding and 16 QAM modulation; otherwise the variations are relatively small but again in each of Cases 14 to 16 there is an improvement in performance as $N_w$ is increased:

TABLE 4

| Case | Code Rate | Mod. | N | FER | Eb/No dB at FER for Nw = | | | |
|------|-----------|------|-----|-----|------|------|------|------|
|      |           |      |     |     | 20 | 22 | 24 | 28 |
| 14 | 3/4 | 8PSK | 20 | 10% | 15.7 | 15.3 | 15.0 | 13.9 |
|    |     |      |    | 1%  | 25.8 | 25.4 | 24.8 | 23.2 |
| 15 | 9/16 | 8PSK | 20 | 10% | 15.4 | 14.8 | 14.3 | 13.3 |
|    |      |      |    | 1%  | 25.4 | 24.7 | 24.0 | 22.4 |
| 16 | 3/4 | 16QAM | 15 | 10% | 15.8 | 15.1 | 14.5 | 12.0 |
|    |     |       |    | 1%  | 26.0 | 25.2 | 24.1 | 19.2 |

Although the above Tables relate to real channel estimates and uncorrelated fading channels, similar results and performance benefits can be determined for perfect channel estimation and/or correlated fading channels.

For example, the following Table 5 repeats the data of Table 4 for Case 16 for uncorrelated fading, and provides comparison figures (other parameters being the same) for various different correlated fading models identified as Cases 17 to 21, respectfully representing urban and indoor channels, model channels referred to as A and B, and with correlated fading. Again it can be seen from Table 5 that there is an improvement in performance in each case as $N_w$ is increased:

TABLE 5

| Case | Correlation Model | FER | Eb/No dB at FER for Nw = | | | |
|------|-------------------|-----|------|------|------|------|
|      |                   |     | 20 | 22 | 24 | 28 |
| 16 | Uncorrelated | 10% | 15.8 | 15.1 | 14.5 | 12.0 |
|    |              | 1%  | 26.0 | 25.2 | 24.1 | 19.2 |
| 17 | Urban Channel | 10% | 16.2 | 15.5 | 14.8 | 12.1 |
|    |               | 1%  | 26.1 | 25.3 | 24.4 | 19.2 |
| 18 | Indoor Channel | 10% | 16.4 | 15.7 | 14.9 | 12.2 |
|    |                | 1%  | 26.2 | 25.4 | 24.5 | 19.3 |
| 19 | Model Channel A | 10% | 16.6 | 16.0 | 15.1 | 12.2 |
|    |                 | 1%  | 26.8 | 25.8 | 24.2 | 19.7 |
| 20 | Model Channel B | 10% | 20.5 | 19.5 | 18.4 | 14.5 |
|    |                 | 1%  | ~30.5 | 29.4 | 28.4 | 22.5 |
| 21 | Correlated | 10% | 19.6 | 18.9 | 17.8 | 13.9 |
|    |            | 1%  | 29.9 | 28.9 | 27.7 | 22.1 |

Similar results and benefits of embodiments of the invention can also he determined for other parameters of the system, including number of transmit antennas (2 or more), number of receive antennas (2 or more), code rate, modulation method, and values of N and $N_w$ relative to the Walsh code length L.

Generally, if $\beta_w = N_w/L$ denotes a coefficient of channel code resource use, then it can be seen from the bold figures in Tables 1 and 2 above that, for 1% FER, increasing this coefficient $\beta_w$ from 20/32 (63%) to 28/32 (88%) provides power gains of about 2.3 dB at a data rate of 10.8 Mbps, about 7.4 dB at a data rate of 14.4 Mbps, and about 13.9 dB at a data rate of 21.6 Mbps.

Figure 4:
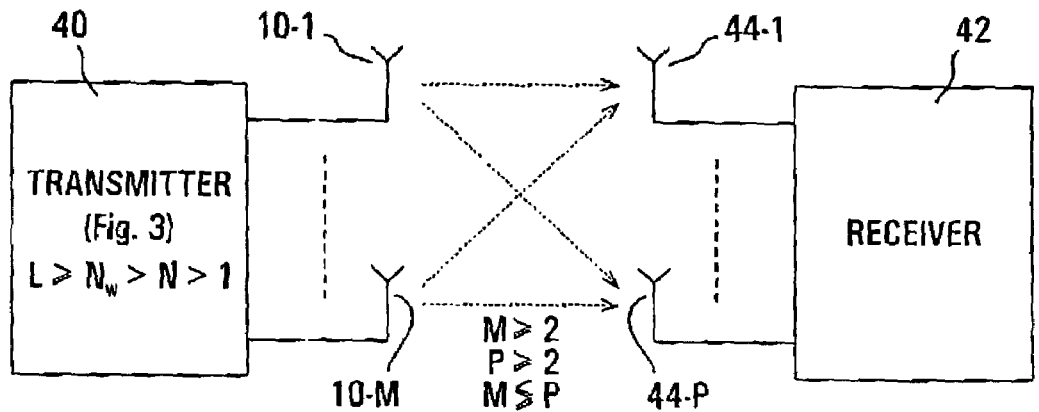
FIG. 4, which is on the same sheet as FIG. 1, illustrates a wireless communications system, using the transmitter of FIG. 3, in accordance with an embodiment of the invention.

FIG. 4 illustrates a wireless communications system using the transmitter of FIG. 3, referenced 40 in FIG. 4 and having the M antennas 10-1 to 10-M as described above. As indicated in FIG. 4, M is greater than or equal to 2, and in the transmitter 40 the Walsh code length L is greater than or equal to the number $N_w$ of Walsh codes used collectively for spreading the M groups of data sub-streams, which in turn is greater than the number N of Walsh codes used for each individual group of data sub-streams (a unique combination of N from $N_w$ being used for each of the M groups as described above), and N is greater than 1.

FIG. 4 also illustrates a receiver 42 having P antennas 44-1 to 44-P, where as indicated P is greater than or equal to 2. Also as indicated in FIG. 4, M can be greater than, equal to, or less than P, so that for example the system can have M=4 transmit antennas and P=2 receive antennas as described above. Arrowed dashed lines from the transmit antennas to the receive antennas indicate the channels from the transmit antennas to the receive antennas, the characteristics of which are estimated to form the channel matrix H referred to above.

Although particular embodiments of the invention are described in detail above, it can be appreciated that numerous modifications, variations, and adaptations may be made within the scope of the invention as defined in the claims.

What is claimed is:

1. A transmitter for a wireless communications system, comprising:

a demultiplexer arranged to produce M groups each of N data sub-streams from data to be transmitted, where N and M are integers greater than one;

M orthogonal code spreaders each arranged to spread the N data sub-streams of a respective one of the M groups using N orthogonal code sequences; and M signal combiners each arranged to combine the N orthogonally spread data sub-streams of a respective one of the M groups to produce a respective combined signal for transmission via a respective one of M transmit antennas;

wherein the N orthogonal code sequences used for each of the M groups comprise a respective one of M different overlapping combinations of N from $N_w$ orthogonal code sequences, where $N_w > N$, whereby at least one of the N orthogonal code sequences is used for a plurality of the M groups.

2. A transmitter as claimed in claim 1 wherein the orthogonal code sequences comprise Walsh functions of length L, where $L = 2^k$ and k is an integer greater than one.

3. A transmitter as claimed in claim 2 wherein $N_w < L$.

4. A transmitter as claimed in claim 1 wherein each signal combiner is also arranged to combine with the respective N orthogonally spread data sub-streams a pilot signal which is orthogonally spread relative to the data sub-streams of the respective group and relative to the pilot signal of each other group.

5. A transmitter as claimed in claim 3 wherein each signal combiner is also arranged to combine with the respective N orthogonally spread data sub-streams a pilot signal which is orthogonally spread relative to the data sub-streams of the respective group and relative to the pilot signal of each other group.

6. A transmitter as claimed in claim 1 wherein the data to be transmitted comprises encoded modulated data, and the transmitter includes an encoder for producing encoded data from a source of data and a modulator arranged to modulate the encoded data to produce the data to be transmitted, a code rate of the encoder, a number of bits per modulation symbol produced by the modulator, and the integers M and N being selected to provide a desired data transmission rate of the transmitter.

7. A transmitter as claimed in claim 2 wherein the data to be transmitted comprises encoded modulated data, and the transmitter includes an encoder for producing encoded data from a source of data and a modulator arranged to modulate the encoded data to produce the data to be transmitted, a code rate of the encoder, a number of bits per modulation symbol produced by the modulator, and the integers M and N being selected to provide a desired data transmission rate of the transmitter.

8. A transmitter as claimed in claim 3 wherein the data to be transmitted comprises encoded modulated data, and the transmitter includes an encoder for producing encoded data from a source of data and a modulator arranged to modulate the encoded data to produce the data to be transmitted, a code rate of the encoder, a number of bits per modulation symbol produced by the modulator, and the integers M and N being selected to provide a desired data transmission rate of the transmitter.

9. A transmitter as claimed in claim 4 wherein the data to be transmitted comprises encoded modulated data, and the transmitter includes an encoder for producing encoded data from a source of data and a modulator arranged to modulate the encoded data to produce the data to be transmitted, a code rate of the encoder, a number of bits per modulation symbol produced by the modulator, and the integers M and N being selected to provide a desired data transmission rate of the transmitter.

10. A transmitter as claimed in claim 1 and including, for each of the M groups, a respective code spreader arranged to spread the respective combined signal in accordance with a PN code, and a respective linear power amplifier arranged to amplify a respective resulting PN code spread signal for transmission via the respective transmit antenna.

11. A transmitter as claimed in claim 2 and including, for each of the M groups, a respective code spreader arranged to spread the respective combined signal in accordance with a PN code, and a respective linear power amplifier arranged to amplify a respective resulting PN code spread signal for transmission via the respective transmit antenna.

12. A transmitter as claimed in claim 6 and including, for each of the M groups, a respective code spreader arranged to spread the respective combined signal in accordance with a PN code, and a respective linear power amplifier arranged to amplify a respective resulting PN code spread signal for transmission via the respective transmit antenna.

13. A wireless communications system comprising a transmitter as claimed in claim 1 with M transmit antennas via which the respective combined signals are transmitted, and a receiver with P receive antennas via which signals transmitted from the transmit antennas are received, where P is an integer greater than one.

14. A wireless communications system comprising a transmitter as claimed in claim 10 with M transmit antennas via which the respective combined signals are transmitted, and a receiver with P receive antennas via which signals transmitted from the transmit antennas are received, where P is an integer greater than one.

15. A system as claimed in claim 13 wherein M>P.

16. A system as claimed in claim 13 wherein M=4 and P=2.

17. A method of increasing orthogonality of signals transmitted from M transmit antennas in a wireless communications system, comprising the steps of:
producing signals to be transmitted from each transmit antenna by combining N data sub-streams orthogonalized by N orthogonal code sequences, M and N being integers greater than one; and
selecting the N orthogonal code sequences used for each of the M transmit antennas as a respective one of M different overlapping combinations of N from $N_w$ orthogonal code sequences, where $N_w$>N, whereby at least one of the N orthogonal code sequences is used in a plurality of the M different combinations.

18. A method as claimed in claim 17 wherein the orthogonal code sequences comprise Walsh functions of length L, where $L=2^k$ and k is an integer greater than one.

19. A method as claimed in claim 18 wherein $N_w$<L.

20. A method as claimed in claim 17 and further comprising the step of combining with the signals to be transmitted from each transmit antenna a pilot signal which is orthogonally spread relative to the data sub-streams for the respective transmit antenna and relative to the pilot signal for each other transmit antenna.

21. A method as claimed in claim 19 and further comprising the step of combining with the signals to be transmitted from each transmit antenna a pilot signal which is orthogonally spread relative to the data sub-streams for the respective transmit antenna and relative to the pilot signal for each other transmit antenna.

22. A transmitter for a wireless communications system, comprising:
a demultiplexer arranged to produce at least two groups of data sub-streams, each group comprising at least two data sub-streams, from data to be transmitted;
at least two orthogonal code spreaders each arranged to spread the data sub-streams of a respective one of the groups using orthogonal code sequences; and
at least two signal combiners each arranged to combine the orthogonally spread data sub-streams of a respective one of the groups to produce a respective combined signal for transmission via a respective one of a plurality of transmit antennas;
wherein different overlapping combinations of the same set of orthogonal code sequences are used for at least two of the groups.

23. A transmitter as claimed in claim 22 and including, for each of the groups, a respective code spreade arranged to spread the respective combined signal in accordance with a PN code, and a respective linear power amplifier arranged to amplify a respective resulting PN code spread signal for transmission via the respective transmit antenna.

24. A method of increasing orthogonality of signals transmitted from a plurality of transmit antennas in a wireless communications system, comprising the steps of:
producing signals to be transmitted from each transmit antenna by combining a plurality of data sub-streams which are orthogonalized by respective orthogonal code sequences; and
selecting the orthogonal code sequences used for the transmit antennas as different overlapping combinations of the same set of orthogonal code sequences.

25. A method as claimed in claim 24 and further comprising the step of combining with the signals to be transmitted from each transmit antenna a pilot signal which is orthogonally spread relative to the data sub-streams for the respective transmit antenna and relative to the pilot signal for each other transmit antenna.

* * * * *